(12) United States Patent
Hesketh et al.

(10) Patent No.: US 10,940,487 B2
(45) Date of Patent: Mar. 9, 2021

(54) INTEGRATED MAGNETIC PARTICLE SEPARATING VALVE AND METHOD

(71) Applicant: SPIROFLOW SYSTEMS, INC., Monroe, NC (US)

(72) Inventors: David Francis Hesketh, Indian Trail, NC (US); Jeffrey Allen Dudas, Waxhaw, NC (US)

(73) Assignee: SPIROFLOW SYSTEMS, INC., Monroe, NC (US)

( * ) Notice: Subject to any disclaimer, the term of this patent is extended or adjusted under 35 U.S.C. 154(b) by 200 days.

(21) Appl. No.: 16/278,292

(22) Filed: Feb. 18, 2019

(65) Prior Publication Data
US 2019/0255535 A1 Aug. 22, 2019

Related U.S. Application Data (60) Provisional application No. 62/632,082, filed on Feb. 19, 2018.

(51) Int. Cl.
| | | |
|---|---|---|
| *B03C 1/30* | (2006.01) | |
| *B03C 1/26* | (2006.01) | |
| *F16K 31/08* | (2006.01) | |
| *B03C 1/033* | (2006.01) | |
| *F16K 1/22* | (2006.01) | |

(52) U.S. Cl.
CPC .............. *B03C 1/26* (2013.01); *B03C 1/0332* (2013.01); *B03C 1/30* (2013.01); *F16K 1/223* (2013.01); *F16K 31/08* (2013.01); *B03C 2201/20* (2013.01)

(58) Field of Classification Search
CPC ........... B03C 1/26; B03C 1/0332; B03C 1/30; B03C 2201/20; F16K 31/08; F16K 1/223

USPC .......................... 209/225, 226, 224, 217, 231
See application file for complete search history.

(56) References Cited

U.S. PATENT DOCUMENTS

| | | | | |
|---|---|---|---|---|
| 4,457,838 A | * | 7/1984 | Carr ........................ | B03C 1/284 209/223.2 |
| 4,750,996 A | * | 6/1988 | Meister ................... | B03C 1/284 209/223.1 |
| 5,066,390 A | * | 11/1991 | Rhodes ................... | B03C 1/284 209/217 |

(Continued)

FOREIGN PATENT DOCUMENTS

EP 2727650 A1 5/2014

OTHER PUBLICATIONS

International Search Report for International Application No. PCT/US 2019/018409; dated Apr. 23, 2019; 3 pages.

(Continued)

*Primary Examiner* — Patrick H Mackey
(74) *Attorney, Agent, or Firm* — Shumaker, Loop & Kendrick, LLP (57) ABSTRACT

A magnetic particle separating valve that includes a valve body adapted for allowing particulate matter to flow vertically through the valve from an upstream to a downstream side. A discharge flow control apparatus is positioned in the valve body and includes a plurality of blades positioned in the valve body and movable between a fully open to a fully closed position to control the rate of discharge of material from the valve. Each of the plurality of blades includes a magnet positioned on the respective blade in a flow proximity position to attract and remove magnetically attractable particles from the particulate matter flowing past the blades.

18 Claims, 11 Drawing Sheets

(56) References Cited

U.S. PATENT DOCUMENTS

| | | | | |
|---|---|---|---|---|
| 5,188,239 | A * | 2/1993 | Stowe | B03C 1/284 |
| | | | | 209/223.1 |
| 5,316,151 | A * | 5/1994 | Thompson | B03C 1/284 |
| | | | | 209/223.1 |
| 5,427,249 | A * | 6/1995 | Schaaf | B03C 1/284 |
| | | | | 209/223.2 |
| 5,819,949 | A * | 10/1998 | Schaaf | B03C 1/284 |
| | | | | 209/223.2 |
| 6,446,836 | B1 * | 9/2002 | Aalto | G01G 13/248 |
| | | | | 222/58 |
| 8,474,629 | B1 * | 7/2013 | Allore | B03C 1/284 |
| | | | | 209/223.1 |
| 10,300,497 | B2 * | 5/2019 | Kwasniewicz | B03C 1/03 |
| 10,807,101 | B2 * | 10/2020 | Pallin | B03C 1/0332 |
| 2005/0045547 | A1 | 3/2005 | Anderson et al. | |
| 2013/0240413 | A1 | 9/2013 | Keaton et al. | |

OTHER PUBLICATIONS

Written Opinion for International Application No. PCT/US 2019/018409; dated Apr. 23, 2019; 9 pages.

\* cited by examiner

INTEGRATED MAGNETIC PARTICLE SEPARATING VALVE AND METHOD

CROSS REFERENCE TO RELATED PATENT APPLICATIONS

This application claims the benefit of and priority to U.S. Provisional Patent Application No. 62/632,082, filed Feb. 19, 2018, herein expressly incorporated by reference in its entirety.

TECHNICAL FIELD AND BACKGROUND OF THE INVENTION

This application relates to an integrated magnetic particle separating valve, a method of separating magnetic particles from a moving stream of bulk materials, and more specifically to the manner in which products stored in bulk are discharged. Bulk materials of the type relevant to this application include many types of granular and powder materials that are stored in hoppers, silos, bins, and bulk bags before being conveyed to another location to use in a process. Prior to use the bulk material may have been processed using equipment with metal components that can potentially contaminate the bulk material with metal particles. These undesirable magnetic contaminants must be removed from the bulk material to improve the quality and safety of the material. This is particularly important where the bulk material is used in food processing.

There are several devices, generally referred to as "valves", that are available and that utilize moving blades to "control" or constrict the discharge of a bulk material through an opening and close the opening for the purpose of preventing material flow, or partially close the opening to reduce the material flow rate. However, there are inefficiencies and disadvantages inherent in these currently available devices that limit the removal of metal particles without the use of a secondary device.

There is a need for a valve that efficiently controls the flow of material from a bulk storage apparatus that includes multiple options that can improve process efficiency and reduce the space required to separate magnetic contamination from the material. There is also a need to provide a valve that efficiently controls the flow of material from a bulk storage apparatus quickly while providing enhanced cleaning capability and material screening functions with feed accuracy and material safety.

BRIEF SUMMARY

It is therefore an object of the invention to provide a controlled material feed from a vessel by using actuated rotating blades that are provided with position control.

It is another object of the invention to provide controlled material feed from a vessel wherein the blades are positioned on one or more planes, and provide multiple positions of opening restriction required to achieve a desired flow rate from the vessel.

It is another object of the invention to permit the positon of the blades to be derived from a 'loss in weight' signal generated in real time as the bag contents are being discharged.

It is another object of the invention to provide a method for removing magnetic particles from a moving material stream in accordance with the disclosure of this application.

These and other objects and advantages of the invention are achieved by providing the embodiments described below.

According to embodiments of the invention, a magnetic particle separating valve includes a valve body adapted for allowing particulate matter to flow vertically through the valve from an upstream side to a downstream side; a discharge flow control apparatus positioned in the valve body, the discharge flow control apparatus comprising a plurality of blades positioned in the valve body; where the discharge flow control apparatus is adapted for moving among a plurality of positions and selectively stopping at each of the plurality of positions in order to control a rate of discharge of the particulate matter from the upstream side, thereby resulting in a stopping position when the discharge flow control apparatus selectively stops. The magnetic particle separating valve also includes at least one magnet adapted for positioning proximate one of the plurality of blades in a flow proximity position; where the magnet is configured to attract and remove magnetically attractable particles from the particulate matter flowing past the blades.

In some embodiments, the plurality of positions comprises a fully open position wherein the plurality of blades collectively define a plurality of substantially vertical planes, a fully closed position, wherein the plurality of blades are substantially ninety degrees offset from the vertical planes, thereby forming a substantially horizontal plane, and a plurality of intermediate positions between the fully open position and the fully closed position.

In some embodiments, the plurality of blades are positioned on one or more planes.

In some embodiments, the magnet has an elongate shape and is substantially disposed within the blade.

In some embodiments, the magnet comprises a tube bar magnet.

In some embodiments, the magnet is substantially disposed within the blade and the blade is substantially non-magnetic.

In some embodiments, the magnetic particle separating valve also includes a magnet drawer assembly comprising a plurality of magnets each adapted for positioning proximate one of the plurality of blades in a flow proximity position, wherein the magnet drawer assembly is adapted for: (i) insertion into the magnet particle separating valve in order to enable attraction and removal of magnetically attractable particles from the particulate matter flowing past the blades; and (ii) removal from the magnet particle separating valve.

In some embodiments, the magnetic particle separating valve also includes at least one sensor adapted for sensing a loss of weight characteristic associated with an upstream vessel as the particulate matter flows through the discharge flow control apparatus and generating in real time a loss-in-weight signal based thereon; and a control device electrically coupled with the at least one sensor and adapted for (i) receiving the loss-in-weight signal, and (ii) sending one or more control signals to the discharge flow control apparatus to cause the plurality of blades to move from one position to another position of the plurality of positions in order to control the rate of discharge of the particulate matter. In some such embodiments, the magnetic particle separating valve also includes an actuator electrically coupled with the control device and operatively coupled with the discharge flow control apparatus and configured to receive the one or more control signals from the control device; and cause at least one of the plurality of blades to move from one position to another position of the plurality of positions in order to control the rate of discharge of the particulate matter.

In some embodiments, the magnetic particle separating valve also includes a sensor for detecting an amount of magnetically attractable particles that have been attracted to one or more of the blades and generating in real time a magnetic particle signal; and a control device for receiving the magnetic particle signal from the sensor and causing a responding action. In some such embodiments, the control device is further configured to send one or more control signals to the discharge flow control apparatus to cause the plurality of blades to move from one position to another position of the plurality of positions in order to control the rate of discharge of the particulate matter. In some of these embodiments, the magnetic particle separating valve also includes an actuator electrically coupled with the control device and operatively coupled with the discharge flow control apparatus and configured to receive the one or more control signals from the control device; and cause the plurality of blades to move from one position to another position of the plurality of positions in order to control the rate of discharge of the particulate matter.

In other such embodiments, the magnetic particle separating valve also includes a magnet drawer assembly comprising a plurality of magnets each adapted for positioning proximate one of the plurality of blades in a flow proximity position, wherein the magnet drawer assembly is adapted for (i) insertion into the magnet particle separating valve in order to enable attraction and removal of magnetically attractable particles from the particulate matter flowing past the blades, thereby resulting in an inserted position; and (ii) removal from the magnet particle separating valve, thereby resulting in a removed position, where the control device is further configured to send one or more control signals to the discharge flow control apparatus to cause the magnet drawer assembly to move (i) from the inserted position to the removed position or (ii) from the removed position to the inserted position. In some such embodiments, the magnetic particle separating valve also includes an actuator electrically coupled with the control device and operatively coupled with the discharge flow control apparatus and configured to receive the one or more control signals from the control device; and cause the magnet drawer assembly to move (i) from the inserted position to the removed position or (ii) from the removed position to the inserted position.

According to embodiments of the invention, a method for removing magnetically attractable particles from a flow of particulate matter using a magnetic particle separating valve having a valve body and a discharge flow control apparatus positioned in the body for allowing particulate matter to flow vertically through the valve from an upstream side to a downstream side includes attracting magnetically attractable particles from the particulate matter flowing through the valve, thereby removing the particles from the flowing matter; and removing the magnetically attractable particles from the valve.

In some embodiments, the method includes inserting a magnet drawer assembly comprising a plurality of magnets into the discharge flow control apparatus in order to configure the magnetic separating valve to attract the magnetically attractable particles; and removing the magnet drawer assembly from the discharge flow control apparatus.

In some embodiments, the method includes providing the magnetic particle separating valve having a valve body and a discharge flow control apparatus positioned in the body for allowing particulate matter to flow vertically through the valve from an upstream side to a downstream side.

In some embodiments, the method includes controlling a rate of discharge of the particulate matter by moving the discharge flow control apparatus among a plurality of positions. In some such embodiments, controlling includes sensing a loss of weight characteristic associated with an upstream vessel as the particulate matter flows through the discharge flow control apparatus; generating, in real time and based on the sensed loss of weight characteristic, a loss-in-weight signal representing; and moving the discharge flow control apparatus among the plurality of positions to vary a flow rate of the particulate matter from the upstream side to the downstream side.

According to embodiments of the invention, a system for removing magnetically attractable particles from a particulate matter flow includes a magnetic particle separating valve, comprising a valve body adapted for allowing particulate matter to flow vertically through the valve from an upstream side to a downstream side; and a discharge flow control apparatus positioned in the valve body, the discharge flow control apparatus comprising a plurality of blades positioned in the valve body; and at least one magnet adapted for positioning proximate one of the plurality of blades in a flow proximity position, the magnet configured to attract and remove magnetically attractable particles from the particulate matter flowing past the blades; a particulate matter vessel adapted for housing particulate matter on the upstream side of the valve, the vessel having an aperture at its distal end proximate the valve such that particulate matter flows vertically from the vessel through the valve to the downstream side of the valve; and at least one agitator operatively coupled with the magnetic particle separating valve and adapted for agitating the particulate matter to induce flow through the valve.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

The present invention is best understood when the following detailed description of the invention is read with reference to the accompanying drawings, in which.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Referring now to the drawings and the listing of machine components set out below, the invention according to a preferred embodiment is described in further detail.

Figure 1:
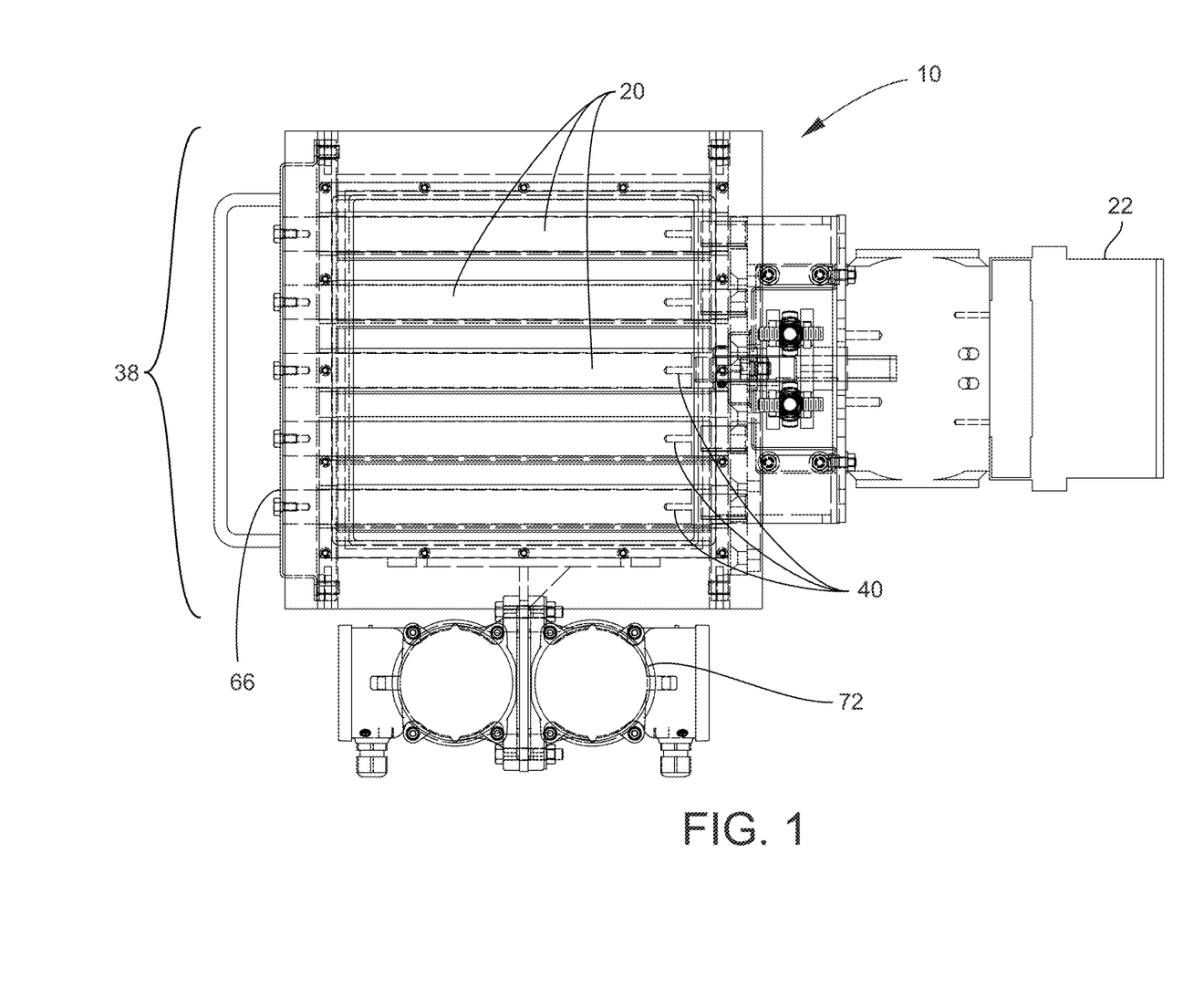
FIG. 1 is a plan view of the integrated magnetic particle separation valve according to an embodiment of the invention.
Figure 2:
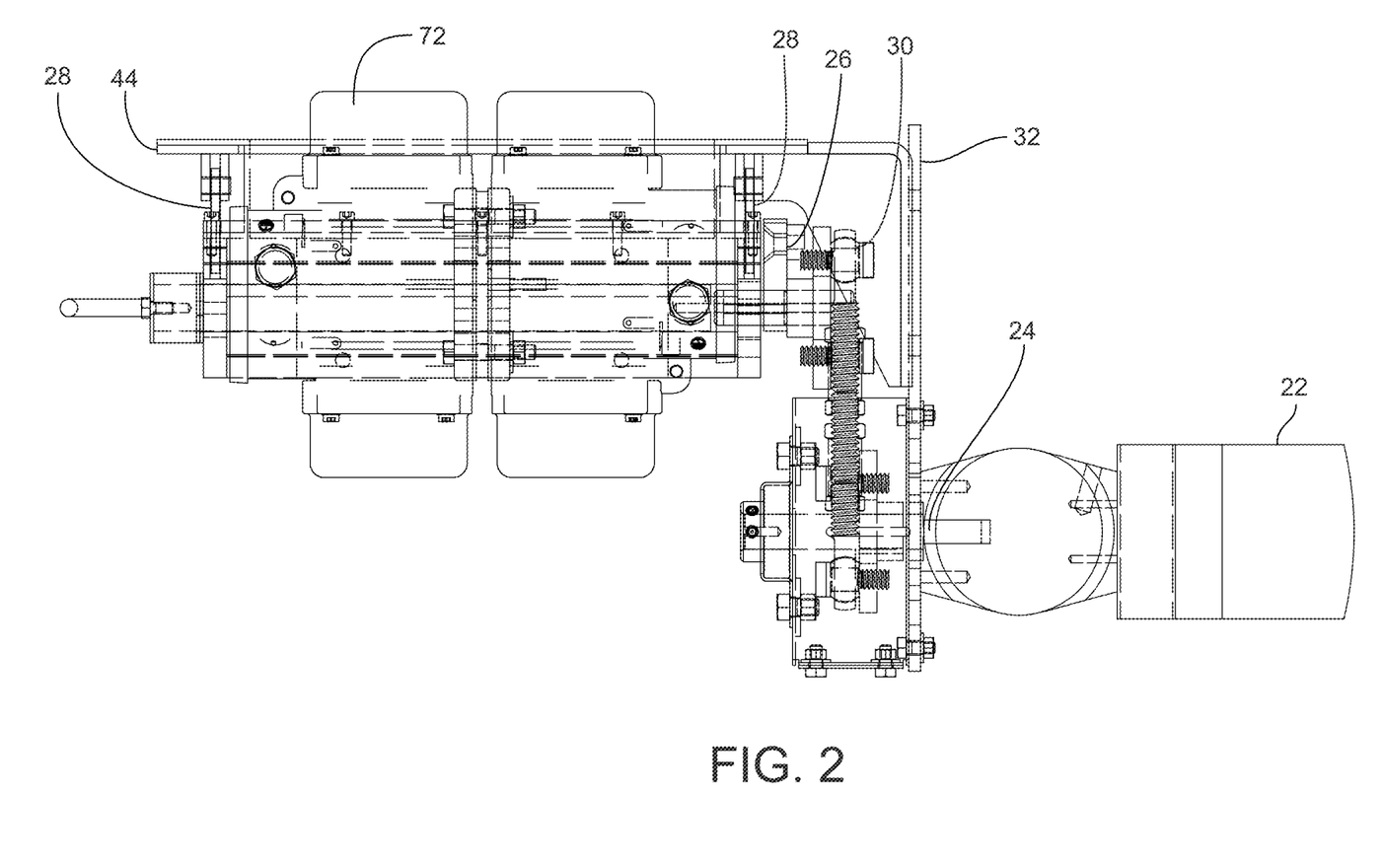
FIG. 2 is an elevation view of the integrated magnetic particle separation valve shown in FIG. 1.
Figure 3:
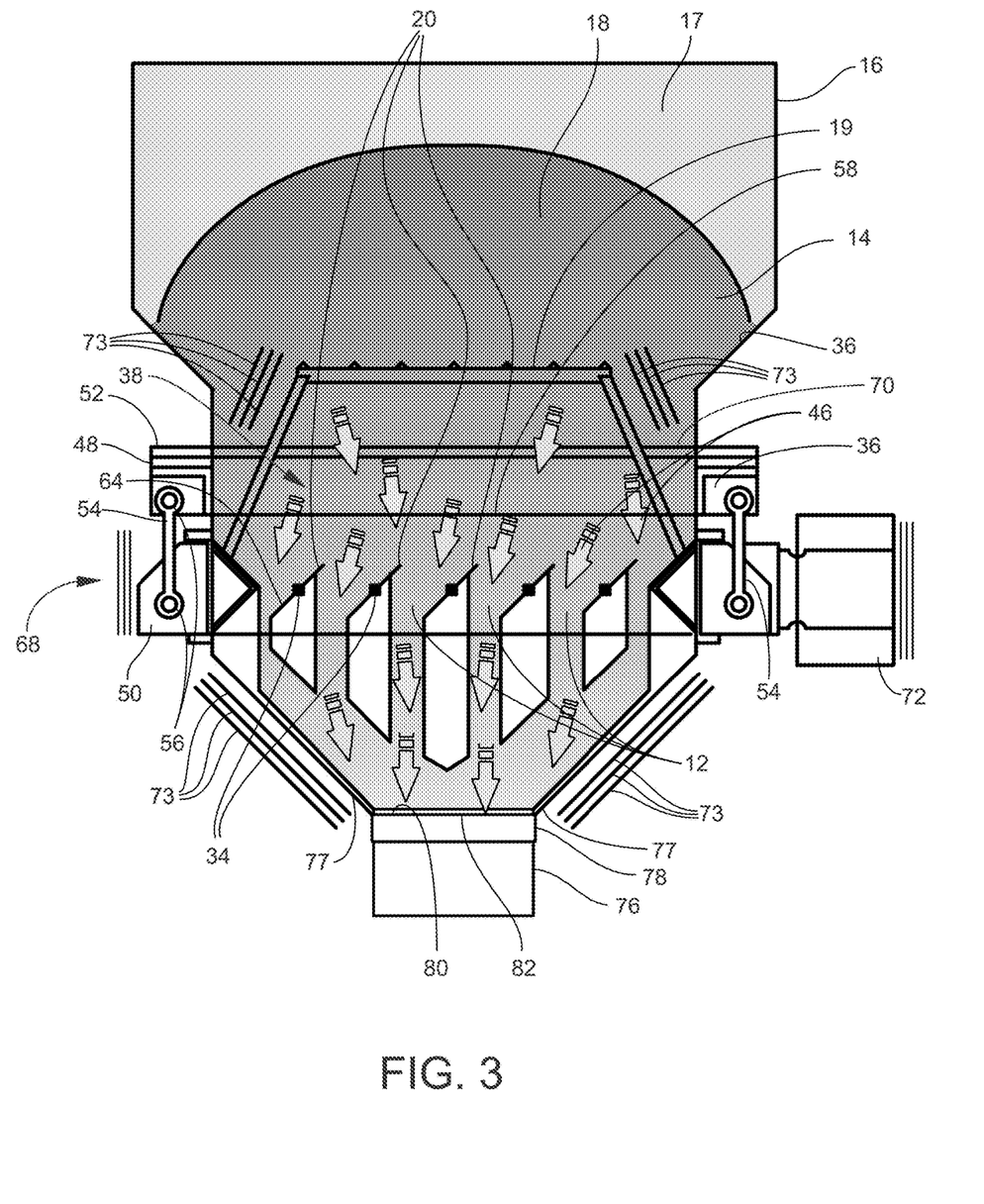
FIG. 3 is an elevation view of the valve blade assembly of the integrated magnetic particle separation valve showing the principle of material flow.
Figure 4A:
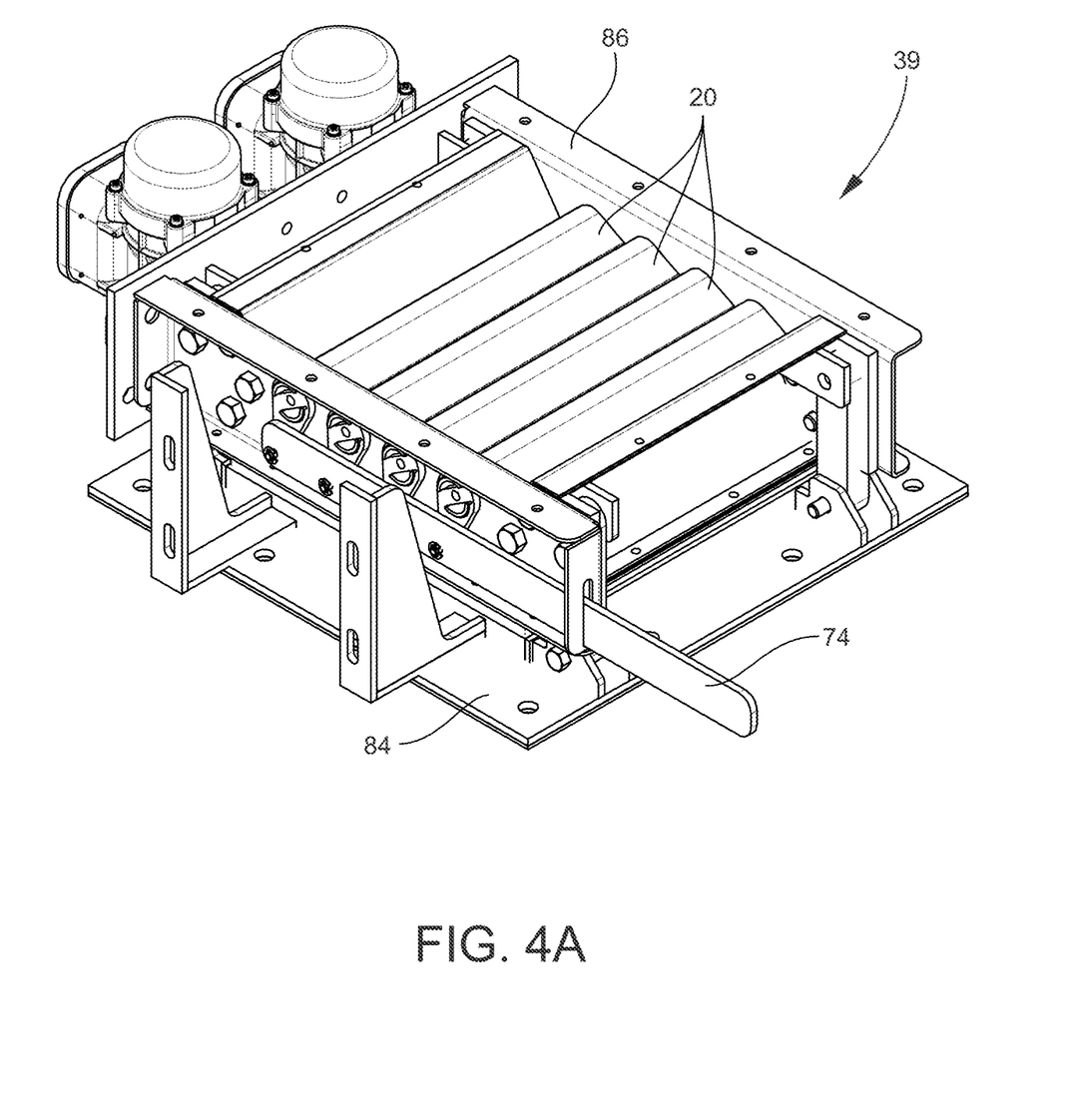
FIG. 4A is a perspective underneath view of an embodiment of an integrated magnetic particle separation valve mounted in a frame.
Figure 4B:
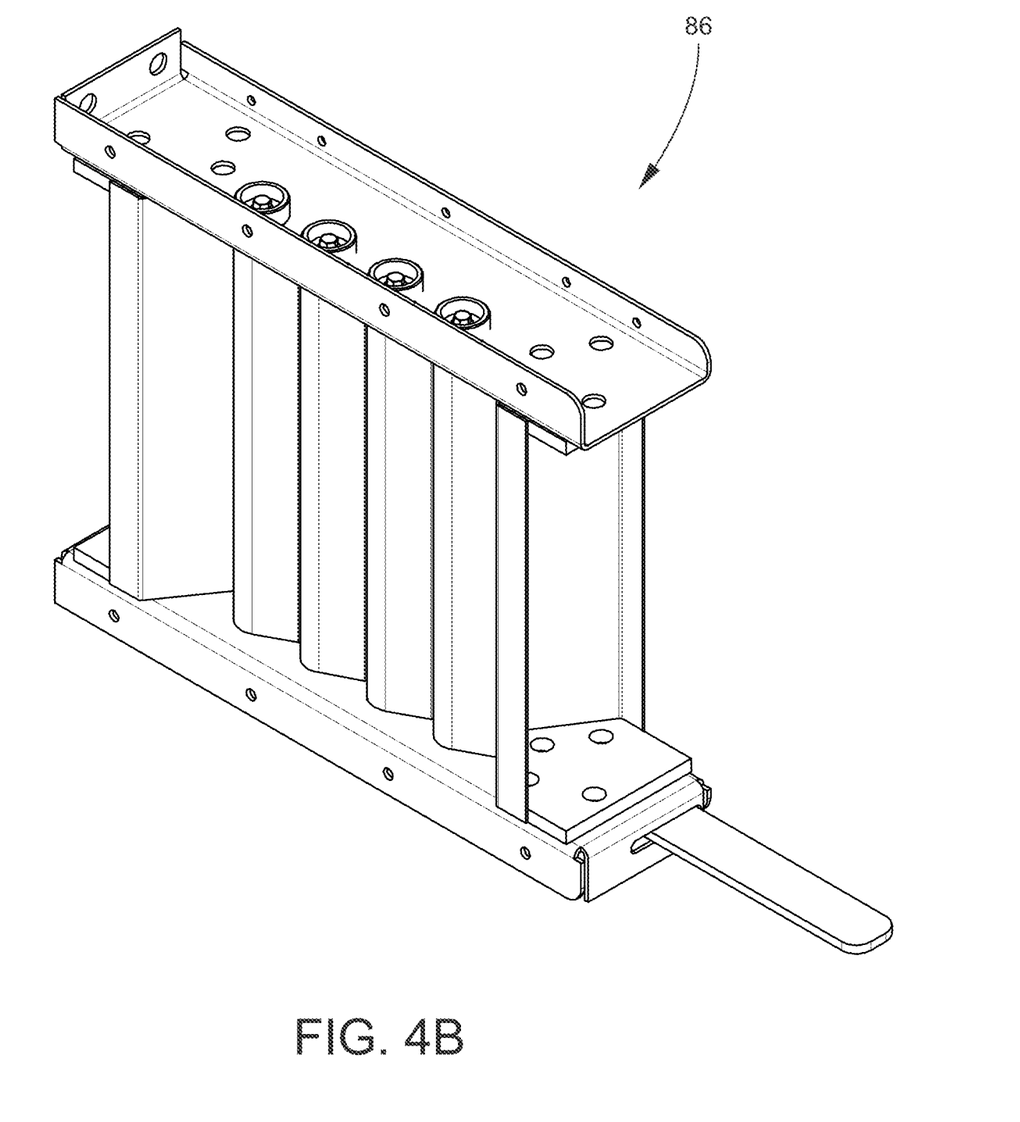
FIG. 4B is a perspective overhead view of the integrated magnetic particle separation valve of FIG. 4A.
Figure 5A:
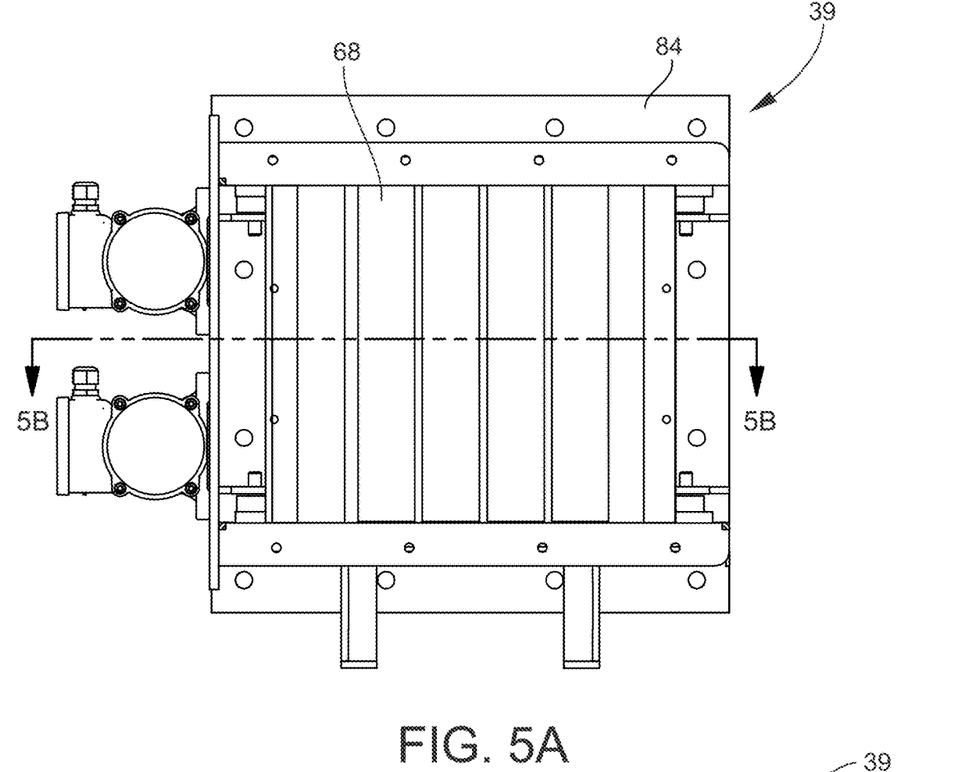
FIG. 5A is an overhead plan view of the integrated magnetic particle separation valve shown in FIGS. 4A and 4B.
Figure 5B:
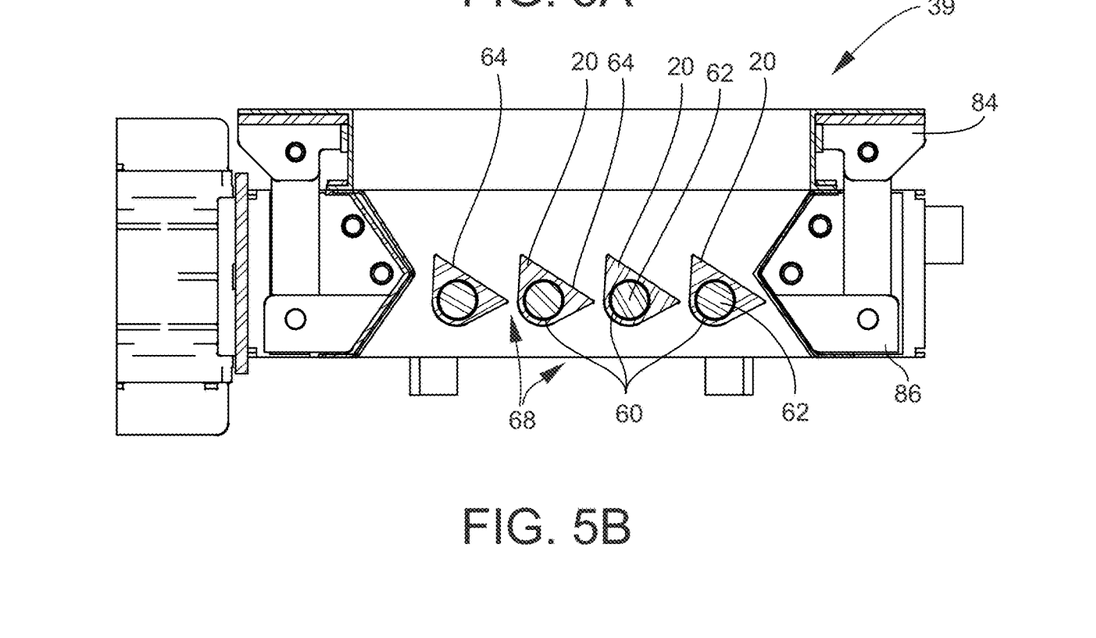
FIG. 5B is a view of cross-section cut from FIG. 5A.
Figure 5C:
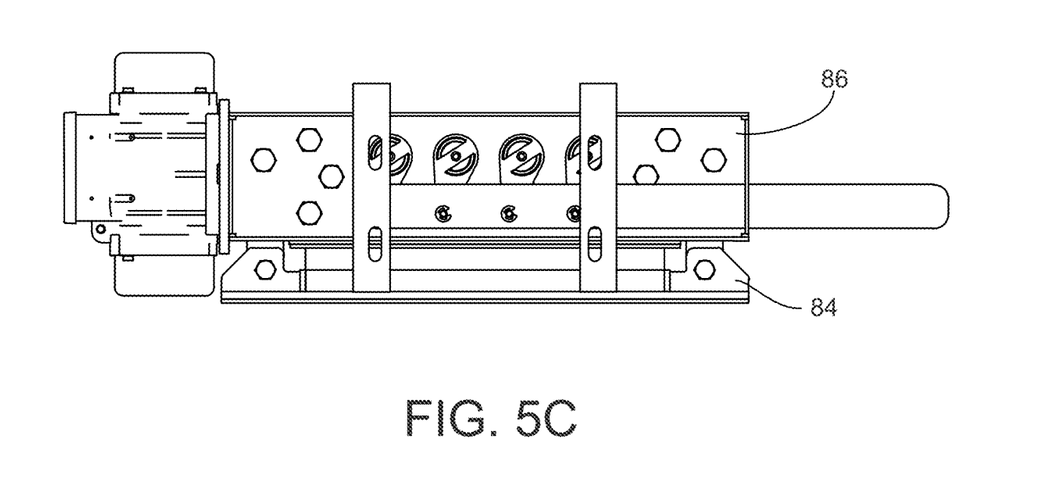
FIG. 5C is an elevation view of the integrated magnetic particle separation valve shown in FIGS. 4A and 4B.
Figure 5D:
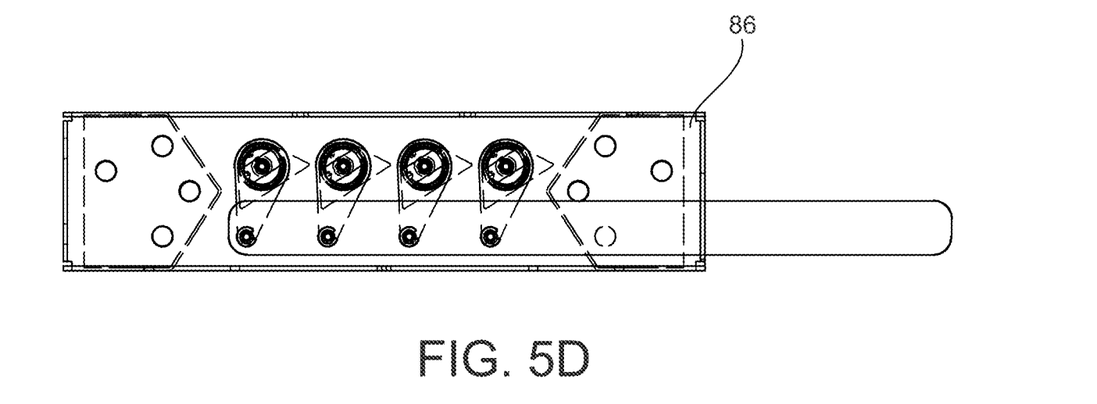
FIG. 5D is an elevation view of the blade actuation levers from FIG. 5A.
Figure 5E:
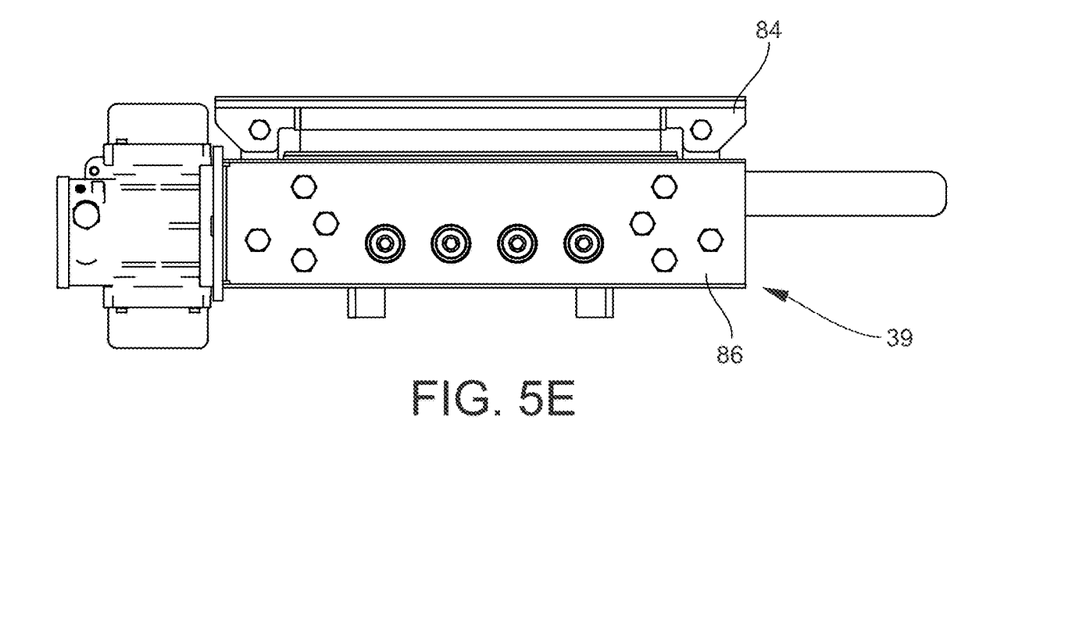
FIG. 5E is an elevation view of the integrated magnetic particle separation valve opposite of FIG. 5C.
Figure 5F:
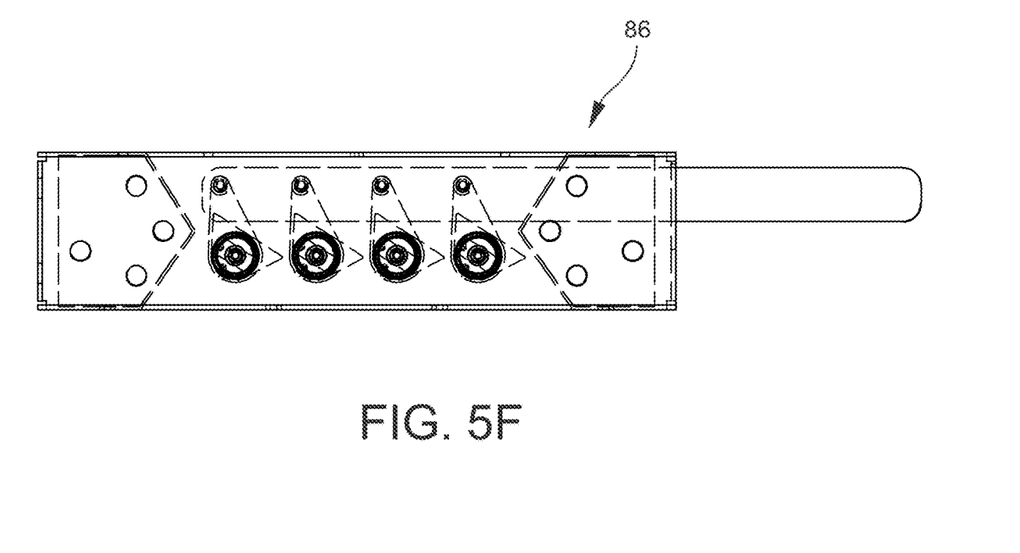
FIG. 5F is an elevation view of the blade actuation levers from FIG. 5A.
Figure 5G:
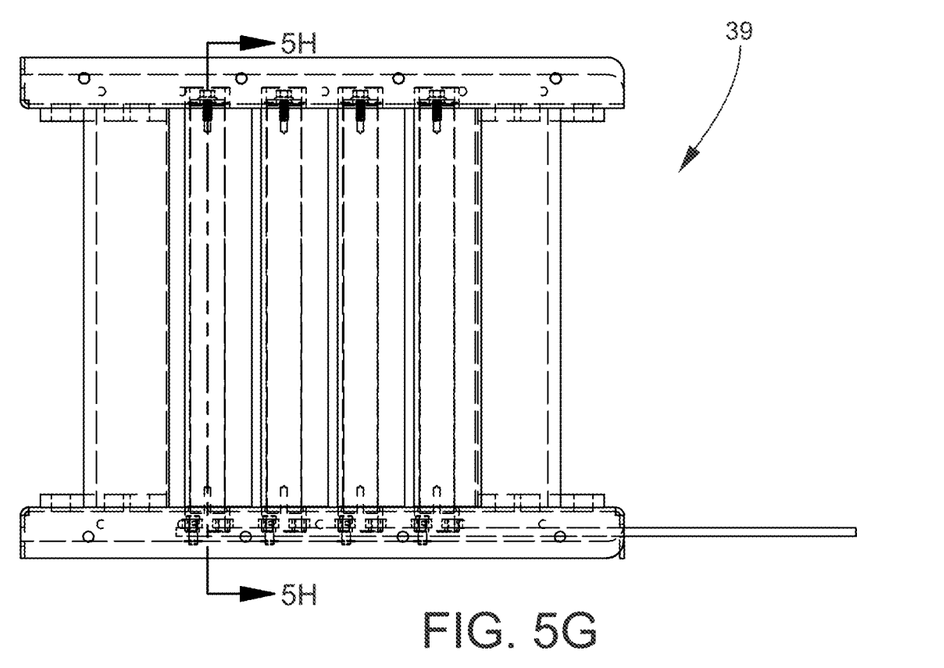
FIG. 5G is a plan view of the integrated magnetic particle separation valve shown in FIGS. 4A and 4B.
Figures 5H, 5I:
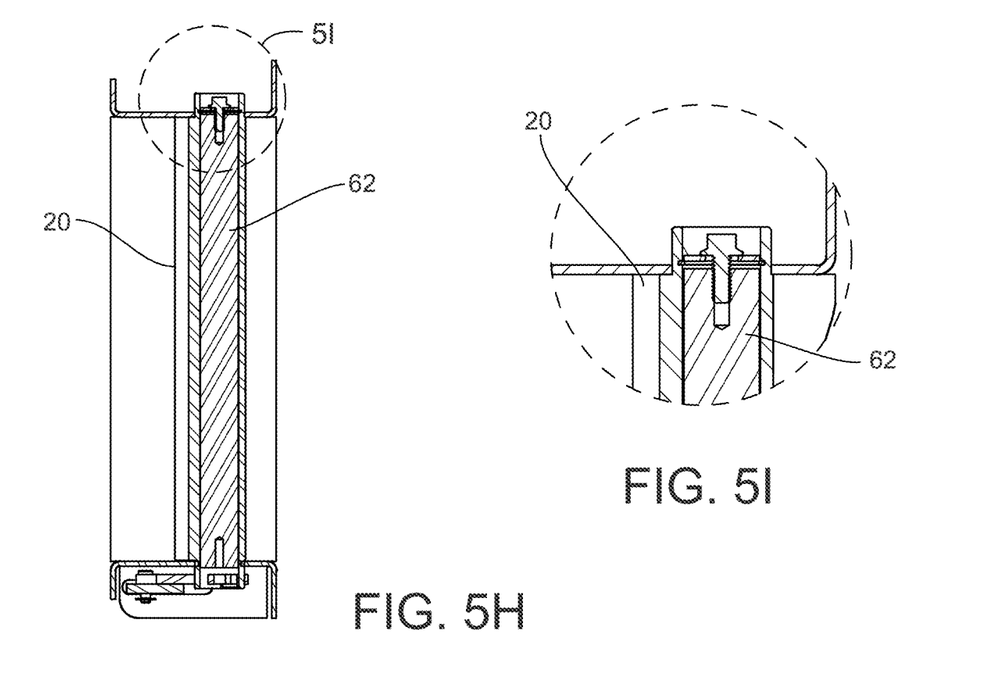
FIG. 5H is a view of cross-section cut from FIG. 5G.
FIG. 5I is a detail cut from FIG. 5H.

Referring to FIGS. 1-3, embodiments of the invention provide for a discharge flow control apparatus 10 for adjustably controlling the size of the blade openings 12 to control the rate of discharge of material 14 from a vessel 16. The discharge flow control apparatus 10 includes multiple aligned axially mounted pivoting blades 20 that can be set at variable angles and collectively define a flat plane when fully closed, or multiple vertical planes when fully open. The fully open position is ninety degrees (90°) offset from the horizontal fully closed plane (0°). Each of the blades 20 is controlled by one actuator 22 that is adapted to move a shaft 24 that rotates from zero degrees (0°) to ninety degrees (90°). The movement of the shaft 24 rotates a lever 26 mounted to the actuator shaft 24 that has a tie rod 28 attached at either end, and the tie rods 28 move relative to the movement of the shafts 24. This creates vertical movement of the first and second tie rod 28 where the upper end (30) of the tie rod 28 causes movement in a mechanism 32 (which is a parallelogram in some embodiments) that is attached to the blades 20. Movement of the mechanism 32 creates rotation of the blades 20 about their respective axes 34. A plurality of sensors 36, such as load cells, monitor weight reduction in the vessel 16 feeding the valve 38 in real time as the material 14, such as particulate material or contents, flows from the vessel 16 through the valve blades 20 and provide output signals (not shown) indicating a weight reduction. A control device 700 (see FIG. 7) receives the output signals from the sensors 36 and sends feedback control signals (not shown) to the valve blade actuator 22 that moves the mechanism 32 to control the size of the blade opening 12 and control the rate of discharge.

In accordance with another embodiment of the invention, the actuator 22 includes positon control feedback sensors 40 that provide additional input changes to the control device 700 and confirm the position of the valve blades 20.

More specifically, the integrated magnetic particle separating valve 38 shown in the drawings is a gravity fed device, typically located on the discharge assembly of a bulk material storage vessel 16. The valve 38 is connected to the vessel 16 via a flanged top surface and secured by bolting the flange 44 of the valve 38 to the flange 52 of the vessel 16. The purpose of the valve 38 is to control the flow (as represented by arrows 46 in FIG. 3) of material 14 from the storage vessel 16 and to separate magnetic particulate contaminants (not shown) from the bulk material 14 as it flows through the valve 38. Flow is achieved by closing an orifice to prevent flow and then varying the opening of the orifice from partially open to fully open to achieve the desired flow rate through the orifice. The valve 38 will be sized to suit the appropriate bulk material flowrate required.

The valve 38 includes a two-part body that can be considered as an upper body 48 and a lower body 50. The upper body 48 has a top surface 44 (or flange) that connects to a vessel 16 and supports the valve 38. The lower body 50 is suspended from the upper body 48 by four tie rods 54 with tie rod end bearings 56 that allow the lower body 50 to swing like a pendulum below the upper body 48. The upper body 48 is typically fixed, whereas the lower body 50 is free to swing as discussed. The upper body 48 and lower body 50 are connected by a sleeve 58, which may be made of a flexible material and formed to have a flanged face on the upper and lower surfaces to connect the upper and lower bodies 48 and 50 and still allow movement of the lower body 50 relative to the upper body 48, that is fixed to the vessel 16. The lower body 50 has several blades 20 located within the orifice. Each of the blades 20 is mounted and constrained to pivot on its respective axis 34 and each is interconnected by a lever mechanism that rotates the blades 20 in unison and relative to the orifice and valve body. The blades 20 can be constructed from a material that it suitable as a bearing at the pivot points. The construction of each blade 20 includes an internal bore 60 that is adapted to mount a bar magnet 62. The magnet 62 propagates a magnetic field (not shown) within the valve 38 opening that attracts passing magnetic particles (not shown) onto the surface 64 of the blade 20 and prevents the particles from passing through with the bulk material 14.

The magnets 62 are mounted to a frame 66 that allows them to be withdrawn from the valve 38 to permit the outer surface 64 of the blades 20 to be cleaned. The design of the blades 20 permits the blade 20 and magnet assembly 68 to be withdrawn together for cleaning outside of the bulk material 14 flow path. Another feature of the design is to include a screen 70 mounted above the blades 20 to further remove contaminants.

The valve 38 includes two counter-rotating vibrators 72 that produce a linear force in the direction of the pivot assembly that causes the lower body 50 to move relative to the upper body 48 and the constraints of the tie bar 54 pivots 56. The purpose of the vibration is to promote material flow through the restricted valve blade 20 openings 12. The blade angle is variable and can be adjusted to prevent material flow when the blades 20 are partially open. Material flow depends on the material properties, such as angle of repose, particle size, density and also the environment where the valve 38 is located. The vibration causes movement of the material particles and allows the blade angle to be adjusted to reduce material flow.

A variable valve position controller or control device 720 (see FIG. 7) can be included that is responsive to a sensor 782 such as a strain gauge that produces a signal that material 14 is flowing and adjusts the opening 12 to meet the desired flow rate. The valve 38 blades 20 are actuated by a chain or linkage 74 driven by a powered actuator 22 that produces a rotational movement to open and close the blades 20. A chute 76, into which the material flows by gravity through the valve 38, is located on the lower valve section. This chute 76 is connected to the valve 38 by a flanged connection 78 on the chute upper surface 80 and the valve body lower section bottom surface 82.

Referring to FIG. 3, consolidated particulate material 17 is shown within the vessel 16. An optional flow promoter 19 may be used to induce flow of difficult materials. The flow promoter 19 is attached to the lower section 50 of the valve 38. When the vibrators 72 cause vibrations (as represented by vibration lines 73), the flow promoter 19 vibrates within the material, thereby activating particulate matter within the vessel 16, as illustrated by the activated particulate matter 18 in FIG. 3 and promoting flow of the material through the valve 38. Anti-vibration links 77 may be used in or near the chute 76 in order to reduce transfer of vibration from the lower section 50 to the chute 76.

The multiple blade construction and bar magnet locations within the blades 20 are perpendicular to the defined bulk material flow column and provide increased surface area contact with the material flow. This increases the potential for magnetic particles to be attracted to the outer surface 64 of the blades 20. This advantage of creating a defined column of bulk material and the additional control of material flow through the valve 38 with the possibility of multiple sets of blades 20 on different planes will result in increased contaminant separation form the bulk material.

Referring now to FIGS. 4A-5I, an embodiment of an integrated magnetic particle separating valve 39 is shown. In several of the figures, the valve 39 includes both a lower section 86 and an upper section 84. The valve 39 is similar to valve 38, but is shown in these figures removed from elements of an entire discharge flow control apparatus 10 (see FIG. 1) for ease of understanding. In some figures, the valve 39 as shown with both upper and lower sections, and in others the upper section is absent from the figures for clarity. The valve 39 is configured for installation in a discharge flow control apparatus 10, such as the apparatus shown in FIG. 1. For example, the lower section 86 may be attached to vibrators (which can be electric and/or pneumatic). The lower section 86 may connect to the next process by way of a sleeve such as a flexible connector. The next process may be a transition chute 76 discussed above. A flexible coupling may link the upper and lower sections and isolate vibration. The upper section 84 attaches to a hopper/silo flange.

A linkage 74 or manual lever is connected to a lever mechanism with a rotating fulcrum attached to the blades 20. The linkage 74 may be moved in order to open, partially open and fully close the blades 20. As discussed above, each of the blades 20 has a flat top surface 64. The blades have internal bores 60 for receiving the magnets 62. When the linkage 74 is moved, the blades rotate in unison about their respective axes from fully closed to full open positions. Blade actuation may be performed by pneumatic and/or electric actuation and can have variable blade stopping positions from zero degrees (0°) to ninety degrees (90°) as discussed above with regard to valve 38.

Figure 6:
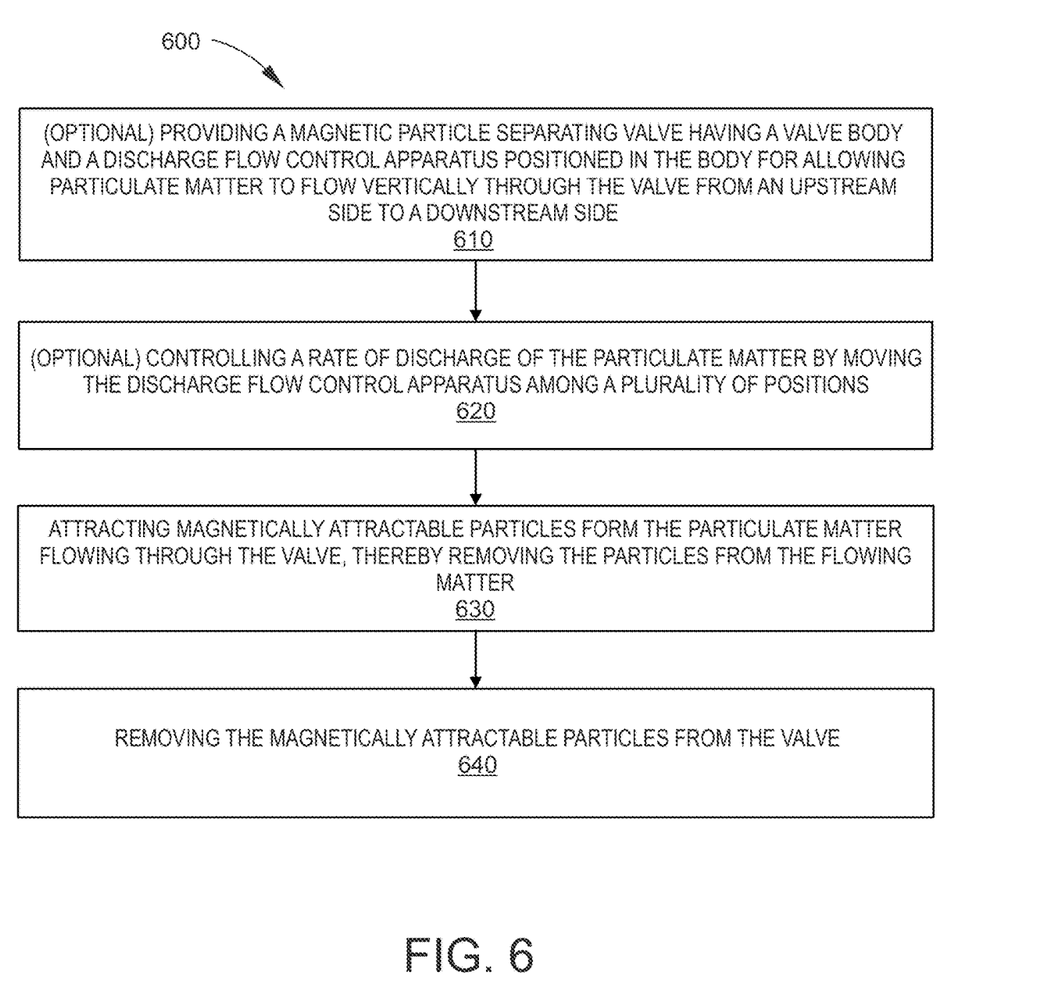
FIG. 6 is a method for using the integrated magnetic particle separation valve shown in the other figures.

In accordance with another embodiment of the invention as illustrated in FIG. 6, a method 600 is provided for removing magnetic particles from a moving material stream in accordance with the disclosure of this application. The first step, as represented by block 610, is the optional step of providing a magnetic particle separating valve. The valve has a valve body and a discharge flow control apparatus positioned in the body for allowing particulate matter to flow vertically through the valve from an upstream side to a downstream side of the valve. The valve provided in step 610 may be the same or similar to valves 38 and/or 39 discussed above.

The next step, as represented by block 620, is the optional step of controlling a rate of discharge of the particulate matter by moving the discharge flow control apparatus among a plurality of positions. This step may be performed by the electronic feedback systems discussed above and with reference to FIG. 7 below.

The next step, as represented by block 630, is to attract magnetically attractable particles from the particulate matter flowing through the valve, thereby removing the particles from the flowing matter. This step is performed, at least in part, by a valve such as valve 38 and/or 39 discussed above, and more specifically is performed by magnets 62 installed/inserted within blades 20 of the valves 38 and/or 39.

The final step shown in the flowchart, as represented by block 640, is to remove the magnetically attractable particles from the valve. This may be done manually or automatically. When flow of the particulate material is stopped, a user may remove the magnetically attractable particles from the valve, for example, by removing the magnets from the blades, such as by removing a magnet assembly from the valve. The blades are, in some embodiments, made of non-magnetic material, and therefore, the magnetically attractable particles will be free for removal from the blades when the magnets are removed from the blades. The blades may be rotated such that their surfaces are non-horizontal and the magnetically attractable particles may fall into a receptacle.

Alternatively, the removal process may be performed automatically. For example, sensors may be disposed on or near the surfaces of the blades to detect when a threshold amount of magnetically attractable particles have been collected on the surfaces of the blades. A control device, such as control device 720 in FIG. 7, may receive signals from the sensors and, once the threshold amount of magnetically attractable particles has been reached, generates and transmits control signals to cease flow of the particulate matter from the vessel. In some cases, a magnetically attractable particle receptacle is moved into the chute by an actuator, in response to control signals from the control device, for receiving the magnetically attractable particles. Then, the magnet assembly is removed from the valve by an actuator receiving control signals from the control device. The magnetic particles are collected in the receptacle and the process described above is reversed when all or most of the magnetic particles have been removed from the blades and collected in the receptacle. Once the process is reversed, that is, the receptacle is removed so that normal operation of the chute may resume, and the magnet assembly is re-installed into the valve, normal material flow is resumed.

Figure 7:
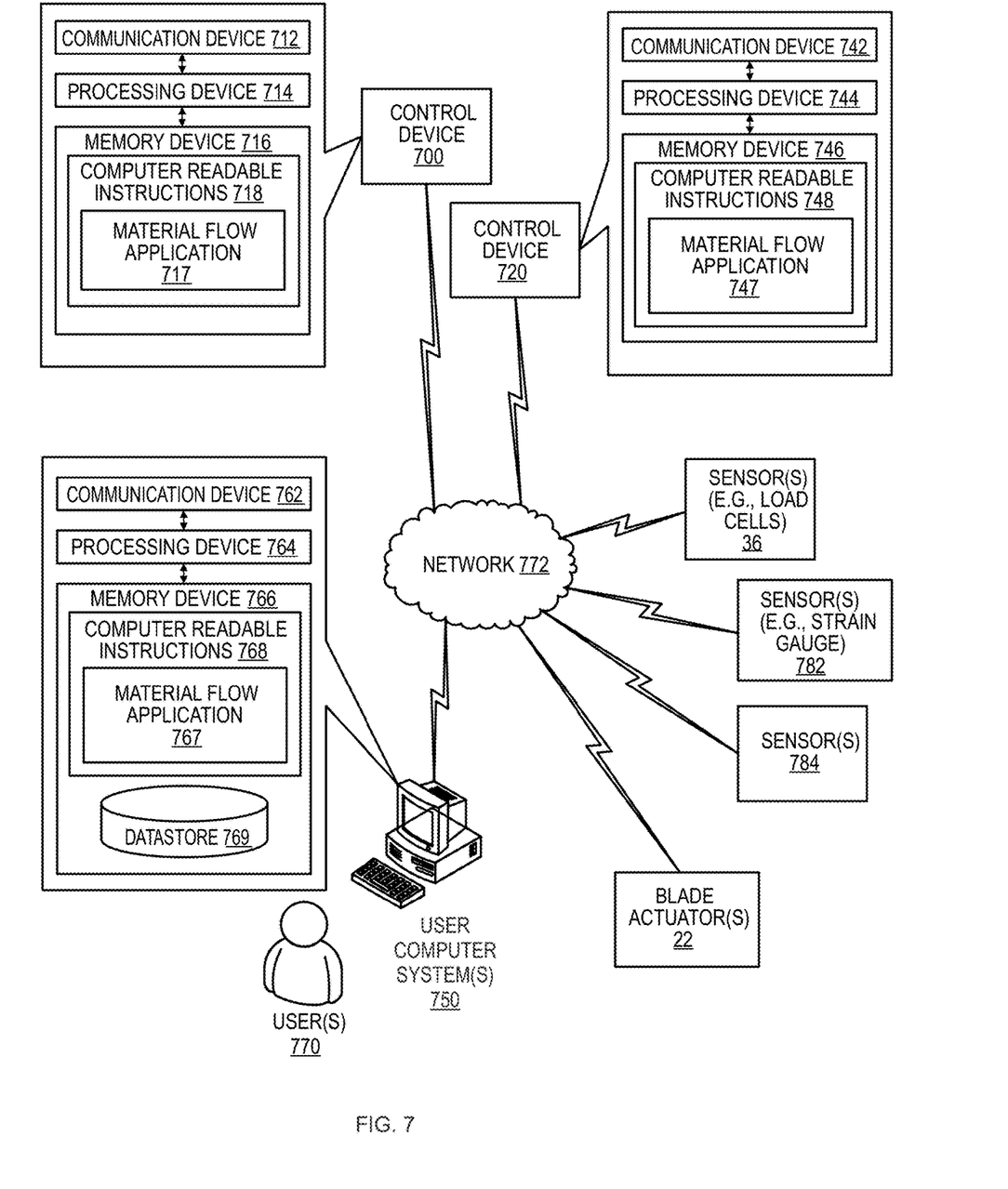
FIG. 7 is a diagram of an environment in which the magnetic particle separation valve operates.

Referring now to FIG. 7, an environment in which a system for controlling the discharge flow control apparatus 10 is shown.

A user computer system 750 is operatively coupled, via a network 772 to the control device 700 and control device 720. In this way, the user 770 may utilize the user computer systems 750 to administer operation of one or more magnetic particle separating valves. FIG. 4 illustrates only one example of embodiments of a such an environment, and it will be appreciated that in other embodiments one or more of the systems (e.g., computers, control devices, sensors, actuators, valves, or other like components or systems) may be combined into a single system or be made up of multiple systems.

The network 772 may be a global area network (GAN), such as the Internet, a wide area network (WAN), a local area network (LAN), or any other type of network or combination of networks. The network 772 may provide for wireline, wireless, or a combination of wireline and wireless communication between devices on the network. The network may also be or represent hardline connections between and/or among certain components within the system. For example, in one embodiment, control device 700 is hardwired to specific sensor(s), such as load cells 36 used in the vessel to determine weight of matter. Control device 720 may be hardwired to specific sensor(s) such as strain gauges 782 as discussed above. In some embodiments, one of control device 700 or 720 also receives signals from other sensors 784 such as sensors to determine an amount of magnetically attractable particles that have accumulated on one or more blades of a valve as described herein. In some embodiments, a single control device may receive signals from all sensors associated with a valve system and may control most or all automatic operation of the valve and system. In other embodiments, multiple control devices control differing aspects of the flow system, as shown in FIG. 7.

As illustrated in FIG. 7, the user computer systems 750 may include a communication device 762, a processing device 764, and a memory device 766. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 764 is operatively coupled to the communication device 762 and the memory device 766. The processing device 764 uses the communication device 762 to communicate with the network 772 and other devices on the network 772, such as, but not limited to, control devices 700 and 720. As such, the communication device 762 generally comprises a modem, server, or other device for communicating with other devices on the network 772.

As further illustrated in FIG. 4, the user computer system 750 comprises computer-readable instructions 768 stored in the memory device 766, which in one embodiment includes the computer-readable instructions 768 of a material flow application 767. In some embodiments, the memory device 766 includes a datastore 769 for storing data related to the user computer system 750 and operation of the valve system, including but not limited to data created and/or used by sensors and/or control devices.

As further illustrated in FIG. 4, the control device 700 generally includes a communication device 712, a processing device 714, and a memory device 716. The processing device 714 is operatively coupled to the communication device 712 and the memory device 716. The processing device 714 uses the communication device 712 to communicate with the network 772, and other devices on the network 772.

Similarly, control device 720 may include a communication device 742, a processing device 744, and a memory device 746. The processing device 744 is operatively coupled to the communication device 742 and the memory device 746. The processing device 744 uses the communication device 742 to communicate with the network 772, and other devices on the network 772.

In some cases, one or both of control devices 700 and/or 720 (and/or other control devices) may be specific-purpose control devices that are hard-coded to perform a finite set of instructions based on differing signals received from operatively coupled sensors and actuators. In such cases, the material flow applications 717 and/or 747 may be hard-coded into the control device(s) as machine code. That is, the control devices may not be programmable in real-time, such as by communication with a user computer system 750. In other embodiments, however, the control device(s) are configured for real-time or near real-time programming such that they may be controlled by the user computer system 750.

An integrated magnetic particle separating valve and method according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A magnetic particle separating valve, comprising:
   (a) a valve body adapted for allowing particulate matter to flow vertically through the valve from an upstream side to a downstream side;
   (b) a discharge flow control apparatus positioned in the valve body, the discharge flow control apparatus comprising a plurality of blades positioned in the valve body;
   (c) wherein the discharge flow control apparatus is adapted for moving among a plurality of positions and selectively stopping at each of the plurality of positions in order to control a rate of discharge of the particulate matter from the upstream side, thereby resulting in a stopping position when the discharge flow control apparatus selectively stops;
   (d) at least one magnet adapted for positioning proximate one of the plurality of blades in a flow proximity position; and
   (e) wherein the magnet is configured to attract and remove magnetically attractable particles from the particulate matter flowing past the blades.

2. The magnetic particle separating valve of claim 1, wherein the plurality of positions comprises a fully open position wherein the plurality of blades collectively define a plurality of substantially vertical planes, a fully closed position, wherein the plurality of blades are substantially ninety degrees offset from the vertical planes, thereby forming a substantially horizontal plane, and a plurality of intermediate positions between the fully open position and the fully closed position.

3. The magnetic particle separating valve of claim 1, wherein the plurality of blades are positioned on one or more planes.

4. The magnetic particle separating valve of claim 1, wherein the magnet has an elongate shape and is substantially disposed within the blade.

5. The magnetic particle separating valve of claim 1, wherein the magnet comprises a tube bar magnet.

6. The magnetic particle separating valve of claim 1, wherein the magnet is substantially disposed within the blade and the blade is substantially non-magnetic.

7. The magnetic particle separating valve of claim 1, further comprising:
   a magnet assembly comprising a plurality of magnets each adapted for positioning proximate one of the plurality of blades in a flow proximity position, wherein the magnet assembly is adapted for:
   (i) insertion into the magnet particle separating valve in order to enable attraction and removal of magnetically attractable particles from the particulate matter flowing past the blades; and
   (ii) removal from the magnet particle separating valve.

8. The magnetic particle separating valve of claim 1, further comprising:
   (a) at least one sensor adapted for sensing a loss of weight characteristic associated with an upstream vessel as the particulate matter flows through the discharge flow control apparatus and generating in real time a loss-in-weight signal based thereon; and
   (b) a control device electrically coupled with the at least one sensor and adapted for (i) receiving the loss-in-weight signal, and (ii) sending one or more control signals to the discharge flow control apparatus to cause the plurality of blades to move from one position to another position of the plurality of positions in order to control the rate of discharge of the particulate matter.

9. The magnetic particle separating valve of claim 8, further comprising an actuator electrically coupled with the control device and operatively coupled with the discharge flow control apparatus and configured to:
   (a) receive the one or more control signals from the control device; and
   (b) cause at least one of the plurality of blades to move from one position to another position of the plurality of positions in order to control the rate of discharge of the particulate matter.

10. The magnetic particle separating valve of claim 1, further comprising:
    (a) a sensor for detecting an amount of magnetically attractable particles that have been attracted to one or more of the blades and generating in real time a magnetic particle signal; and
    (b) a control device for receiving the magnetic particle signal from the sensor and causing a responding action.

11. The magnetic particle separating valve of claim 10, wherein the control device is further configured to send one or more control signals to the discharge flow control apparatus to cause the plurality of blades to move from one position to another position of the plurality of positions in order to control the rate of discharge of the particulate matter.

12. The magnetic particle separating valve of claim 11, further comprising an actuator electrically coupled with the control device and operatively coupled with the discharge flow control apparatus and configured to:
- (a) receive the one or more control signals from the control device; and
- (b) cause the plurality of blades to move from one position to another position of the plurality of positions in order to control the rate of discharge of the particulate matter.

13. The magnetic particle separating valve of claim 1, further comprising an actuator electrically coupled with the control device and operatively coupled with the discharge flow control apparatus and configured to:
- (a) receive the one or more control signals from the control device; and
- (b) cause the magnet drawer assembly to move (i) from the inserted position to the removed position or (ii) from the removed position to the inserted position.

14. A system for removing magnetically attractable particles from a particulate matter flow, the system comprising:
- (a) a magnetic particle separating valve, comprising:
  - (i) a valve body adapted for allowing particulate matter to flow vertically through the valve from an upstream side to a downstream side; and
  - (ii) a discharge flow control apparatus positioned in the valve body, the discharge flow control apparatus comprising:
    - (iii) a plurality of blades positioned in the valve body; and
    - (iv) at least one magnet adapted for positioning proximate one of the plurality of blades in a flow proximity position, the magnet configured to attract and remove magnetically attractable particles from the particulate matter flowing past the blades;
- (b) a particulate matter vessel adapted for housing particulate matter on the upstream side of the valve, the vessel having an aperture at its distal end proximate the valve such that particulate matter flows vertically from the vessel through the valve to the downstream side of the valve; and
- (c) at least one agitator operatively coupled with the magnetic particle separating valve and adapted for agitating the particulate matter to induce flow through the valve.

15. A method for removing magnetically attractable particles from a flow of particulate matter, comprising the steps of:
- (a) providing a valve body adapted for allowing particulate matter to flow vertically through the valve from an upstream side to a downstream side, a discharge flow control apparatus positioned in the valve body and including a plurality of blades positioned in the valve body, wherein the discharge flow control apparatus is adapted to move among a plurality of positions and selectively stop at each of the plurality of positions in order to control a rate of discharge of the particulate matter from the upstream side, thereby resulting in a stopping position when the discharge flow control apparatus selectively stops, at least one magnet adapted for positioning proximate one of the plurality of blades in a flow proximity position;
- (b) magnetically attracting magnetically attractable particles from the particulate matter flowing through the valve proximate the at least one magnet, thereby removing the particles from the flowing matter; and
- (c) removing the magnetically attracted particles from the valve.

16. The method of claim 15, further comprising the step of inserting a magnet assembly comprising a plurality of magnets into the discharge flow control apparatus to thereby configure the magnetic separating valve to attract the magnetically attractable particles.

17. The method of claim 15, further comprising the step of controlling a rate of discharge of the particulate matter by moving the discharge flow control apparatus among a plurality of positions.

18. The method of claim 17, wherein the step of controlling rate of discharge of the particulate matter comprises the steps of:
- (a) sensing a loss of weight characteristic associated with an upstream vessel as the particulate matter flows through the discharge flow control apparatus;
- (b) generating, in real time and based on the sensed loss of weight characteristic, a loss-in-weight signal; and
- (c) moving the discharge flow control apparatus among the plurality of positions to vary a flow rate of the particulate matter from the upstream side to the downstream side in response to the loss-in-weight signal.

* * * * *